US008897177B2

(12) United States Patent  (10) Patent No.: US 8,897,177 B2
Arora  (45) Date of Patent: Nov. 25, 2014

(54) SYSTEMS AND METHODS OF CONDUCTING CONFERENCE CALLS

(71) Applicant: Vonage Network, LLC, Holmdel, NJ (US)

(72) Inventor: Nehar Arora, Old Bridge, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/717,951

(22) Filed: Dec. 18, 2012

(65) Prior Publication Data

US 2014/0169230 A1  Jun. 19, 2014

(51) Int. Cl.
*H04L 12/28* (2006.01)
*H04M 3/56* (2006.01)
*H04J 1/16* (2006.01)

(52) U.S. Cl.
CPC ..................................... *H04M 3/56* (2013.01)
USPC ............................. 370/261; 370/352; 370/401

(58) Field of Classification Search
CPC ......................... H04L 12/1818; H04L 12/1822
USPC ................................... 370/260–269, 352, 401
See application file for complete search history.

(56) References Cited

U.S. PATENT DOCUMENTS

| | | | |
|---|---|---|---|
| 5,903,637 A * | 5/1999 | Hogan et al. | 379/203.01 |
| 6,731,625 B1 * | 5/2004 | Eastep et al. | 370/352 |
| 6,885,740 B2 | 4/2005 | Ernstrom et al. | |
| 6,898,273 B2 | 5/2005 | Ernstrom et al. | |
| 7,511,215 B2 | 3/2009 | Bicker | |
| 8,036,692 B2 | 10/2011 | Ayyasamy et al. | |
| 8,149,262 B2 | 4/2012 | Tucker et al. | |
| 8,184,792 B2 | 5/2012 | Croak et al. | |
| 8,275,107 B2 | 9/2012 | Srinivasan | |
| 2003/0058806 A1 | 3/2003 | Meyerson et al. | |
| 2008/0069325 A1 | 3/2008 | King | |
| 2008/0181140 A1 | 7/2008 | Bangor et al. | |
| 2008/0205616 A1 * | 8/2008 | Teng et al. | 379/202.01 |
| 2009/0109959 A1 * | 4/2009 | Elliott et al. | 370/352 |
| 2009/0122785 A1 | 5/2009 | Liu et al. | |
| 2010/0150030 A1 | 6/2010 | Whitney et al. | |
| 2010/0238842 A1 | 9/2010 | Narayanan et al. | |
| 2011/0182212 A1 | 7/2011 | Smelyansky et al. | |
| 2011/0228922 A1 | 9/2011 | Dhara et al. | |
| 2012/0106728 A1 | 5/2012 | Ghaffari et al. | |
| 2012/0269334 A1 | 10/2012 | Goguen et al. | |
| 2014/0111597 A1 * | 4/2014 | Anderson et al. | 348/14.03 |

OTHER PUBLICATIONS

International Search Report issued for PCT/US2013/074722 on Mar. 21, 2014.
Written Opinion issued for PCT/US2013/074722 on Mar. 21, 2014.

* cited by examiner

*Primary Examiner* — John Pezzlo
(74) *Attorney, Agent, or Firm* — Nixon & Vanderhye, P.C.; Joseph Pagnotta

(57) ABSTRACT

Systems and methods performed by an IP telephony system allow a user to request that his IP telephony device be set into a conference calling mode for an indefinite period of time. When the user's IP telephony device is in the conference calling mode, all parties that attempt to call the user's IP telephony device are added to a conference bridge tied to the user's IP telephony device. All incoming calls are treated in this fashion until the user cancels the conference calling mode and returns to a normal calling mode.

30 Claims, 6 Drawing Sheets

SYSTEMS AND METHODS OF CONDUCTING CONFERENCE CALLS

BACKGROUND OF THE INVENTION

The invention is related to Internet Protocol (IP) telephony systems. More specifically, the invention is related to systems and methods for conducting conference calling to an IP telephony device.

Presently, it is possible to setup a conference call that is connected to an IP telephony device. However, each conference call is set up on an individual basis. This often requires the party who wishes to establish a conference call to obtain a central telephone number that all parties can call to be connected to the conference call. This central telephony number must then be distributed to those parties who are to join the conference call. Also, it is often necessary for the callers to enter one or more special codes in order to be entered into the conference call bridge. Such codes must also be distributed to the people who are to join the conference.

What is needed is a simple way for an individual to setup a conference call. It is also desirable to simplify the way in which people join the conference call.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
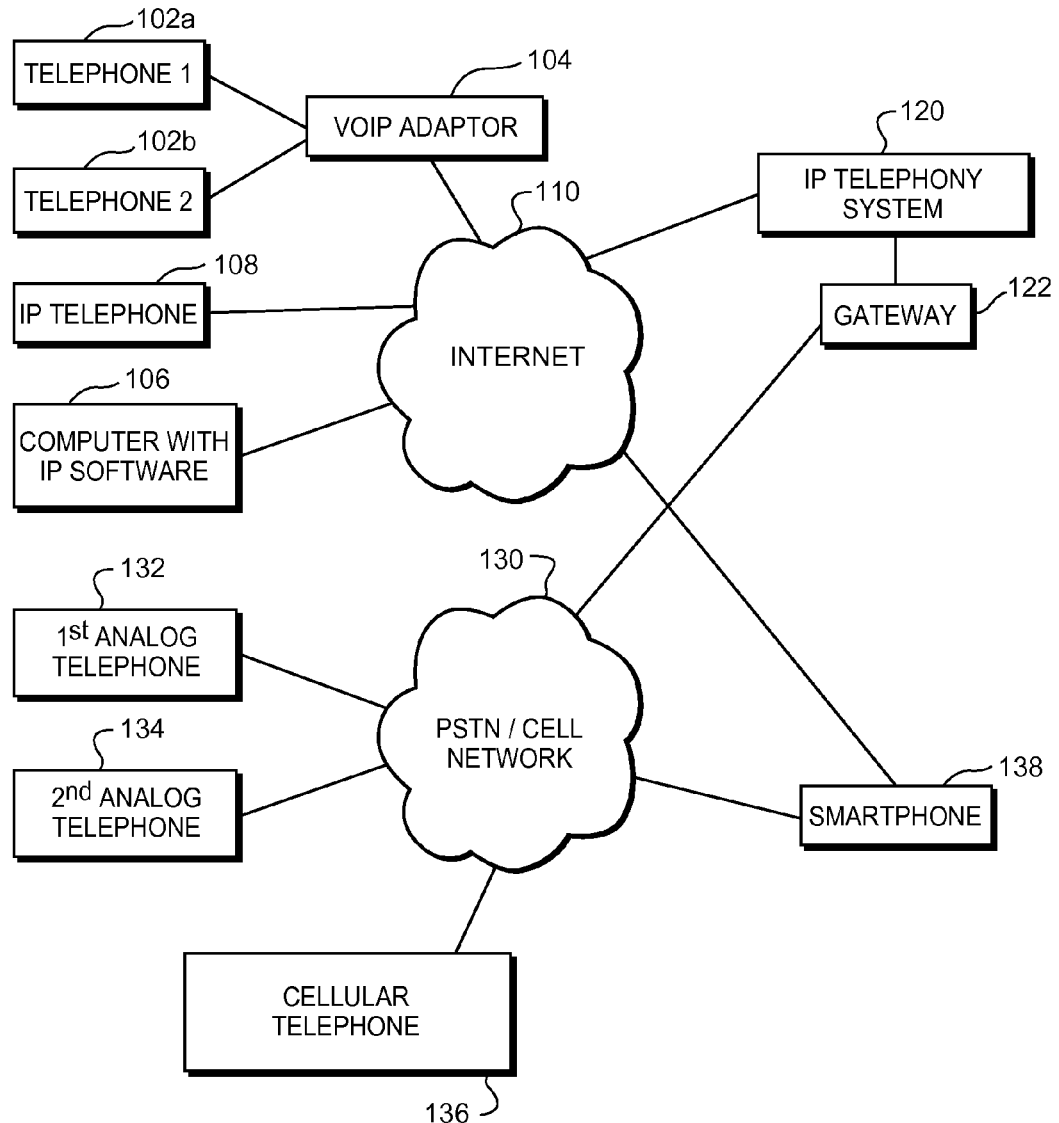
FIG. 1 is a diagram of a communications environment including various elements which are associated with an Internet protocol (IP) telephony system.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 130 via one or more gateways 122.

The gateway 122 allows users and devices that are connected to the PSTN 130 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a and 102b could all be coupled to the same telephone adaptor 104. Analog telephone devices include, but are not limited to, standard telephones and document imaging devices such as facsimile machines. A configuration using a telephone adapter 104 is common where all of the analog telephone devices 102a, 102b are located in a residence or business, and all of the telephone devices are connected to the same telephone adapter. With this configuration, all of the analog telephone devices 102a, 102b share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using a first analog telephone 132 which is connected to the PSTN 130 may call a customer of the IP telephony system 120. In this instance, the call is initially connected from the first analog telephone 132 to the PSTN 130, and then from the PSTN 130, through the gateway 122 to the first IP telephony system 120. The first IP telephony system 120 then routes the call to the customer's IP telephony device. A third party using a cellular telephone 136 could also place a call to an IP telephony system customer, and the connection would be established in a similar manner, although the first link would involve communications between the cellular telephone 136 and a cellular telephone network. For purposes of this explanation, the cellular telephone network is considered part of the first PSTN 130.

In addition, mobile computing devices which include cellular telephone capabilities could also be used to place telephone calls to customers of the IP telephony system 120. A smartphone 138 having both cellular telephone capabilities and the ability to run a software IP telephony client could place a call through a cellular network 130, or via the IP telephony system 120. The smartphone 138 may connect to the IP telephony system 120 via a wireless data connection passing through the cellular network 130, or via a wireless connection to the Internet 110 provided by a wireless access point. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the first analog telephone 132, a second analog telephone 134 or the cellular telephone 136 that is routed through the PSTN 130 to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 130.

Figure 2:
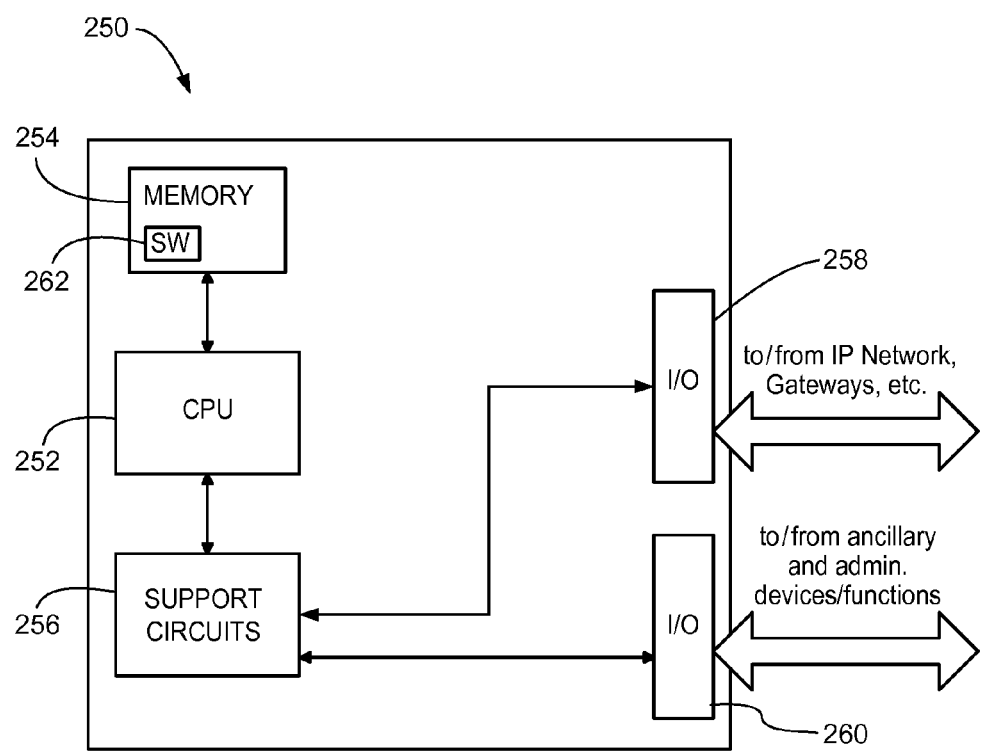
FIG. 2 is a diagram of various elements of a processor that forms part of an IP telephony system or an IP telephony device.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description will also refer to telephony communications and telephony activity. These terms are intended to encompass all types of telephone communications, regardless of whether all or a portion of the calls are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
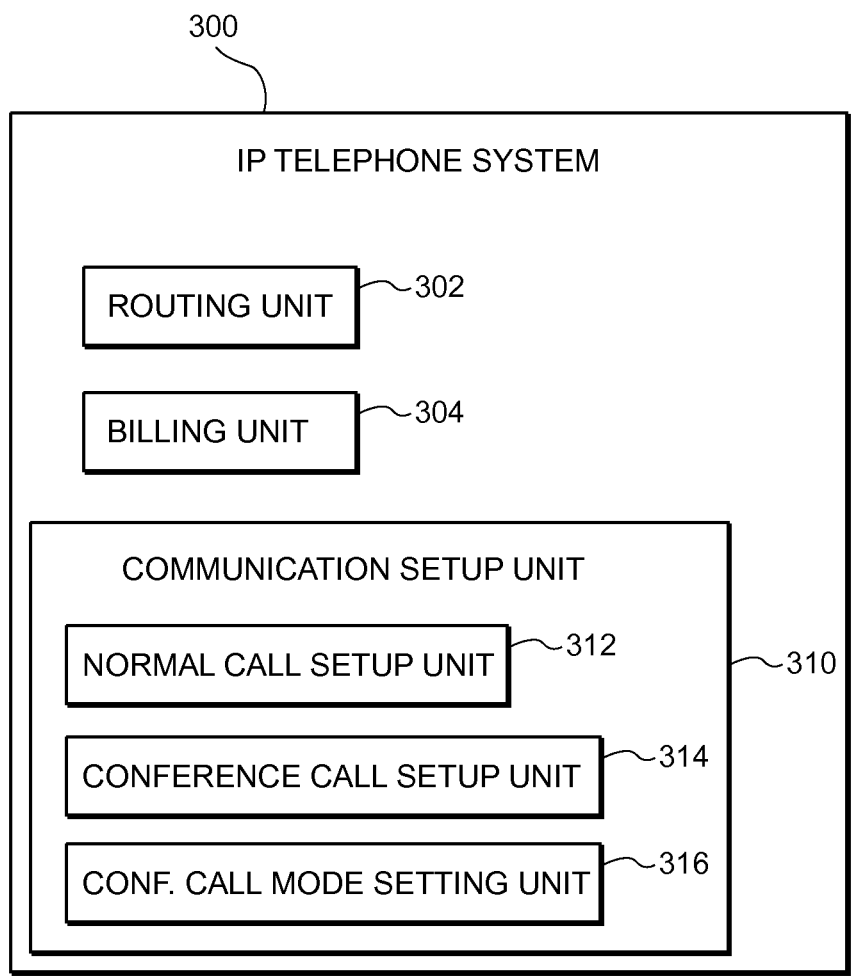
FIG. 3 is block diagram illustrating various elements of an IP telephony system embodying the invention.

FIG. 3 illustrates some elements which may be present in an IP telephony system 300. As shown therein, the IP telephony system 300 can include a routing unit 302 which is responsible for determining how to reach individual telephony devices. The IP telephony system 300 also includes a billing unit 304 that is responsible for billing users for calls and other forms of communications which are routed through the system. The IP telephony system 300 further includes a communication setup unit 310 that is configured to establish telephony communications between telephony devices.

A user's account with the IP telephony system 300 may be associated with a single IP telephony device, or with multiple IP telephony devices/clients. For example, a user's account may be associated with both an IP telephony device 108, and a software client running on a computer 106. A software client on a smartphone 138 may also be associated with the user's account with the IP telephony system 300.

Further, a user's account with the IP telephony system 300 may be associated with a single identifier, such as a telephone number, or with multiple identifiers. For example, the user's account may be associated with a first identifier, such as a telephone number, which is assigned to an IP telephony device 108, as well as a second identifier associated with an IP client running on a smartphone 138.

When the IP telephony system 300 receives an incoming telephony communication setup request that is directed to an identifier (such as a telephone number) associated with a user's account, the communication setup unit 310 attempts to setup the requested telephony communication to one or more of the telephony devices/clients associated with the identifier. This could include attempting to setup the telephony communication to only one of the user's devices which are associated with the identifier, or attempting to setup the telephony communication to multiple ones of the user's devices/clients. In situations where the communication setup unit 310 attempts to setup the telephony communication to multiple devices/clients, the attempt could be made to all of the devices/clients substantially simultaneously, or in a predetermined sequence.

As illustrated in FIG. 3, the communication setup unit 310 includes a normal call setup unit 312 that is configured to setup a normal two party communication between first and second telephony devices. This could include audio or video telephone calls that are placed between two parties, as well as other forms of telephony communications, such as SMS or MMS messages.

The communications setup unit 310 also includes a conference call setup unit 314 which is configured to setup a conference call for multiple parties. In some instances, this can include connecting multiple parties to a single IP telephony device or client. The parties to the conference call could be using other IP telephony devices, or analog or cellular telephones that are reachable only via a PSTN or cellular telephone network.

The communications setup unit 310 further includes a conference call mode setting unit 316. In systems and methods embodying the invention, a user's account with the IP telephony system can be switched between a conference calling mode and a normal mode. If a user's account with the IP telephony system 300 is associated with multiple different identifiers, such as multiple different telephone numbers, it may be possible to switch each identifier between a normal mode and a conference calling mode. The purposes and effects of setting the conference calling mode are described below.

When a user's account is switched to the normal mode, the normal call setup unit 312 handles any incoming telephony communication setup requests that are directed to an identifier associated with the user's account. The normal call setup unit 312 handles the incoming telephony communication setup request in a conventional fashion. If a telephony device associated with the identifier in the setup request is available, the normal call setup unit 312 attempts to setup the requested communication to that telephony device. If the telephony device is already engaged in a telephony communication, the normal call setup unit 312 may play a busy signal to the party that sent the setup request, or the party could be routed to a voicemail system. In some instances, if the called telephony device is already engaged in a telephony communication, a call waiting tone may be played to the called party so that the called party can decide whether to switch to the incoming telephony communication. These conventional ways of handling an incoming telephony communication setup request are well known to those of ordinary skill in the art.

If the user's account is instead switched to the conference calling mode, the conference call setup unit 314 handles the incoming telephony communication setup request. In this instance, the call is essentially treated as a request to enter into a conference call with the called party's telephony device/client. If the called party's telephony device is not already engaged in a telephony communication, the conference call setup unit 314 attempts to setup a first communications session with the called party's telephony device. If the called party's telephony device is already engaged in a telephony communication, the conference call setup unit may simply add the new (calling) party into the existing telephony communication. This is essentially like adding another party to a conference call bridge.

A user of the IP telephony system 300 can issue a request to set their account with the IP telephony system 300 into the conference calling mode. That request is received by the conference call mode setting unit 316, which sets the conference calling mode for the user in response to such a request. As noted above, a request may be for all devices/clients associated with the user's account with the IP telephony system 300. However, if the user's account is associated with multiple different identifiers (such as telephone numbers), the conference calling mode may be individually set for each identifier.

A request to set the conference calling mode on could be sent by the user from one or more of the user's IP telephony devices/clients. Alternatively, a user may be capable of issuing a request to set the conference calling mode on via a web browser interface, or by calling a customer service representative or an interactive voice response system. Likewise, a request to cancel the conference calling mode and to return to the normal calling mode may be issued in the same ways.

Once the user has set the conference calling mode on, all incoming telephony communication requests are handled by the conference call setup unit 314 until the user specifically requests that the conference calling mode be canceled, and that his account (or an identifier associated with an account) be returned to the normal mode.

If a user's account is in the conference calling mode, and only one party at a time seeks to setup a communication with the user's telephony device/client, it likely will appear that things are operating like the normal calling mode. However, whenever a third party attempts to setup a telephony communication with the user while an existing telephony communication is ongoing, the third party will be conferenced into the existing telephony communication. If a fourth party then attempts to setup a telephony communication with the user, the fourth party will also be conferenced into the existing telephony communication.

A system which operates as described above makes it very easy for a user to setup a conference call. The user need only issue a request to have his account set into the conference calling mode. The user's account could be set into the conference calling mode regardless of whether the user is already participating in a telephony communication. Thereafter, anybody that attempts to setup a telephony communication to an identifier associated with the user's account will enter into a conference call with the user. The user does not need to distribute a special conference call bridge number, or any conference call codes, to the people the user wishes to have join the conference call. The parties to the conference call simply call the user's normal telephone number to connect to the conference call.

Once the user no longer wishes to have the conference calling feature activated, the user's simply issues a request to return to the normal calling mode. However, until the user issues such a request, the user's account (or an identifier under the account) will remain in the conference calling mode.

Figure 4:
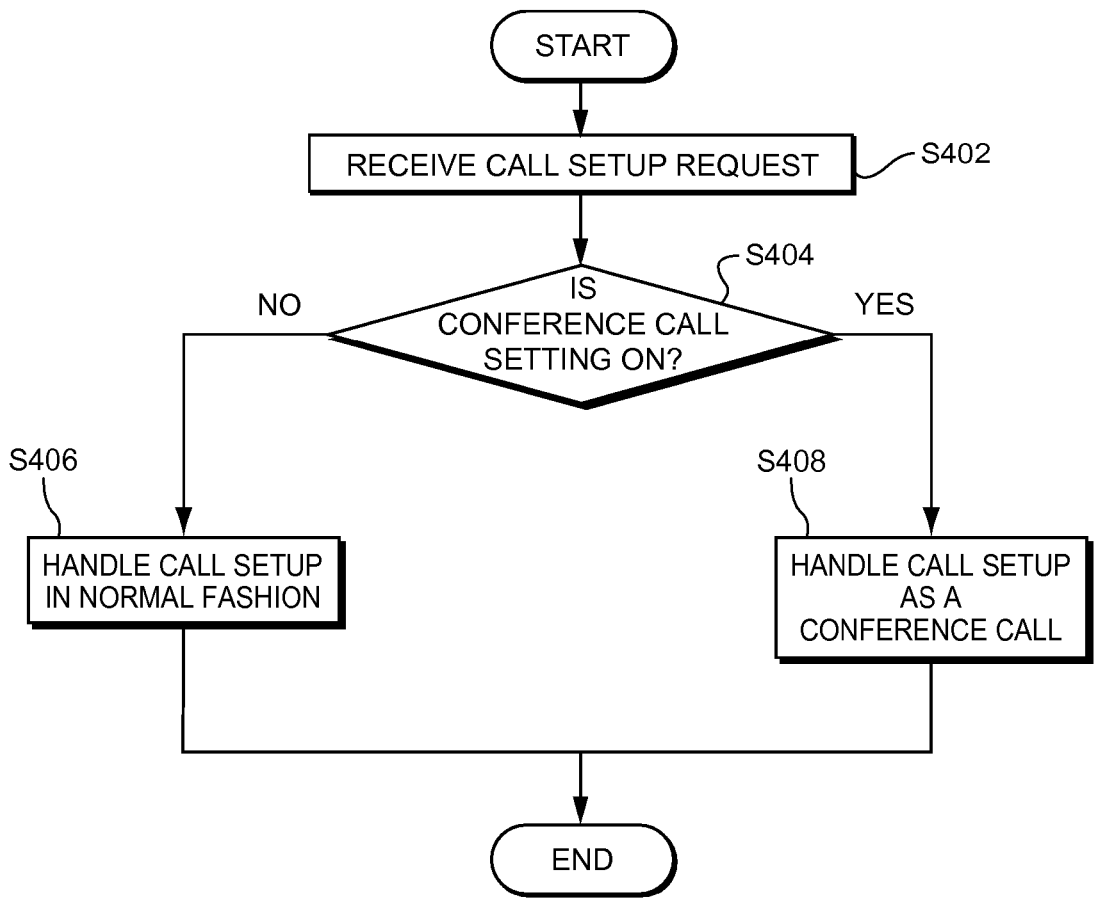
FIG. 4 is a flowchart illustrating steps of a method embodying the invention.

FIG. 4 illustrates steps of a method which would be performed by an IP telephony system embodying the invention when a telephony communication setup request is received. The method begins and proceeds to step S402, where a call setup request is received by the IP telephony system. At step S404, a determination is made as to whether the account or telephony device associated with the identifier in the setup request is in the conference calling mode. If not, the method proceeds to step S406, and a normal call setup unit 312 of the IP telephony system attempts to setup the requested telephony communication in a conventional fashion. If the determination in step S404 indicates that the account or telephony device associated with the identifier in the setup request is in the conference calling mode, the conference call setup unit 314 of the IP telephony system attempts to setup the call in step S408 according to the conferencing calling procedures discussed above. The method would then end.

In some embodiments of the invention, when a telephony communication setup request is received for an account or identifier that is in the conference calling mode, and the called party is already conducting a telephony communication, the setup request could be handled in different ways. In some embodiments, as discussed above, the calling party is simply conferenced into the existing telephony communication.

Figure 5:
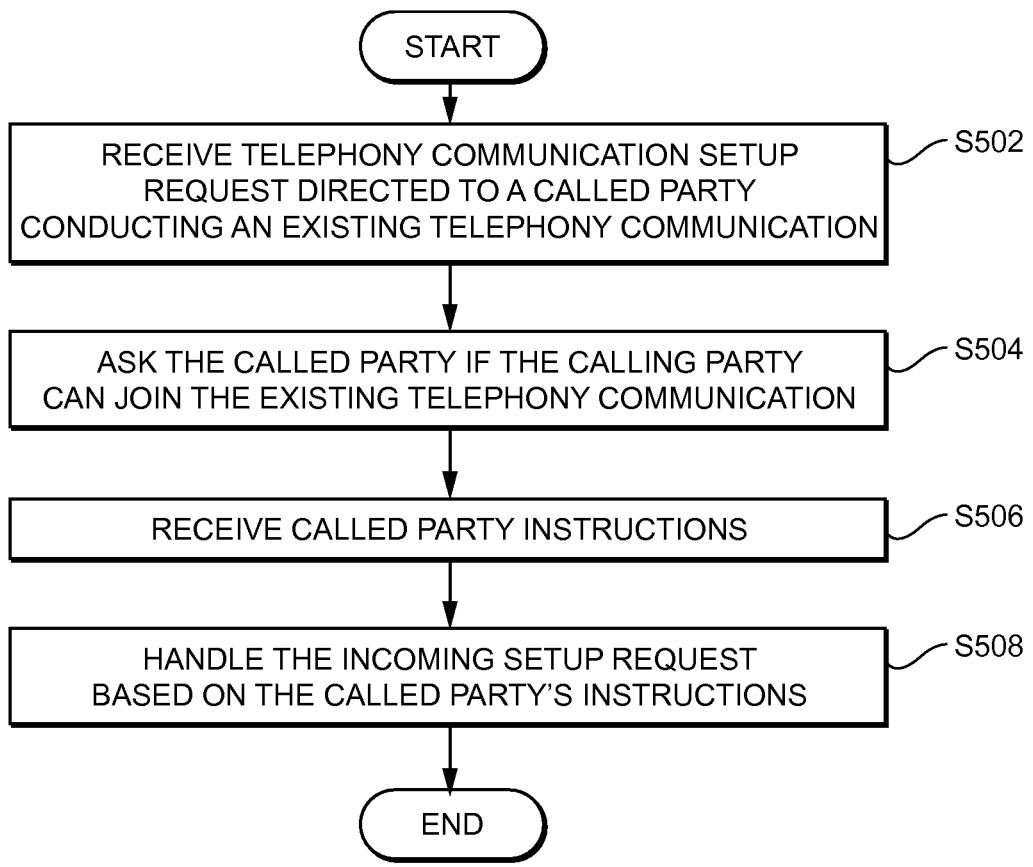
FIG. 5 is a second flowchart illustrating steps of another method embodying the invention.

FIG. 5 illustrates steps of an alternate method that would be performed by the conference call setup unit 314 of an IP telephony system 300 when a telephony communication setup request is received for a called party's account/identifier that is set in the conference calling mode, and where the called party is already conducting an existing telephony communication. The method begins and proceeds to step S502, where the new telephony communication setup request is received. In step S504, the conference call setup unit 314 sends a query to the called party asking if the new calling party should be allowed to join the existing telephony communication. Caller ID information in the setup request could be provided to the called party to help the called party make a decision about whether to allow the calling party to join the existing telephony communication. Also, the conference call setup unit may use the caller ID information in the setup request to obtain additional information about the calling party, and that information could also be sent to the called party.

The query could be sent to the called party in a number of different ways. In some embodiments, a push notification could be sent to the called party's telephony device. In other embodiments, the called party may receive an audio communication from the conference call setup unit 314. In other instances, a text message, an instant message or an e-mail notification could be sent to the called party. Any other form of query could also be sent to the called party to inform the called party that the calling party is attempting to setup a telephony communication with the called party.

In step S506, the conference call setup unit 314 receives instructions back from the called party. The instructions could be sent to the conference call setup unit 314 in any of the ways identified above for the original query, or in any other fashion. Then, in step S508, the incoming setup request is handled based on the called party's instructions. This includes but is not limited to adding the calling party to the existing telephony communication, sending the calling party to voicemail, indicating that the calling party is unavailable.

Figure 6:
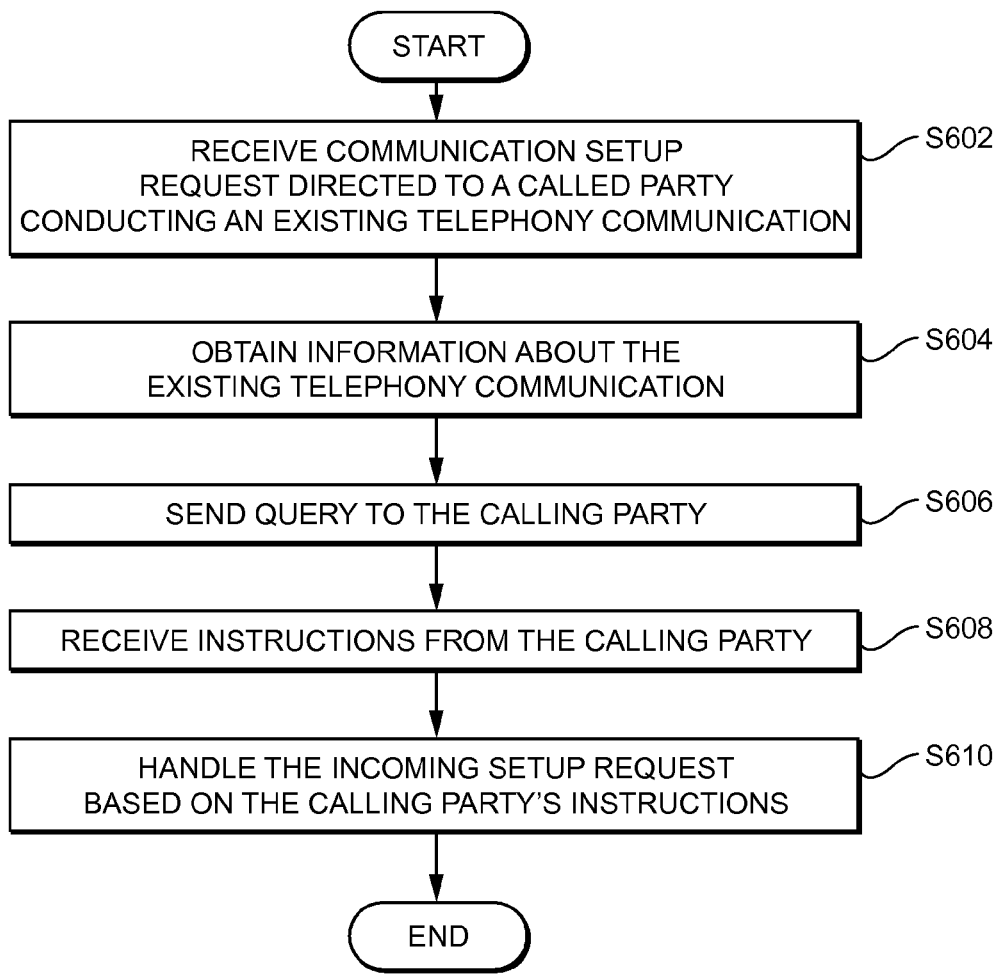
FIG. 6 is a third flowchart illustrating steps of another method embodying the invention.

FIG. 6 illustrates steps of another method that could be performed by the conference call setup unit when an incoming telephony communication setup request is received for a called party who has their account/identifier set into the conference calling mode, and where the called party is already conducting a telephony communication. The method begins and proceeds to step S602, where the incoming setup request is received. In step S604, the conference call setup unit 314 obtains information about the existing telephony communication being conducted by the called party. This could include obtaining information about the number and/or identity of the parties to the existing telephony communication.

In step S606 a query is sent to the calling party asking how the calling party would like their setup request to be handled. The query could include the information obtained about the existing telephony communication already being conducted by the called party. The query could be sent to the calling party in a number of different ways, such as by sending a push notification to the calling party's telephony device. In other embodiments, the calling party may receive an audio communication from the conference call setup unit 314. In other instances, a text message, an instant message or an e-mail notification could be sent to the calling party. Any other form of query could also be sent to the calling party.

In step S608, the conference call setup unit 314 receives instructions from the calling party about how the calling party's setup request should be handled. This could include conferencing the calling party into the existing telephony communication, routing the calling party to voicemail, or handling the calling party's setup request in any other fashion. In step S610, the conference call setup unit 314 handles the setup request as specified by the calling party.

With methods as described above in connection with FIGS. 5 and 6, additional information is used to determine how to handle a call setup request when the called party has set his account in the conference call mode, and where the called party is already conducting a telephony communication. This makes it possible to selectively add callers to an ongoing conference call. This also make it possible to avoid joining a conference call when the calling party wishes to speak privately to the called party.

In some embodiments, the user may have the ability to request that his account be set into the conference calling mode at a particular time, and/or that if be set back into a normal calling mode at a particular time. If the user has requested that his account be set from the conference calling mode back into the normal calling mode, and a conference call is ongoing at the point in time that the account is to revert to the normal calling mode, the account will remain in the conference calling mode until the conference call that is in progress has ended. After which, the account will revert to the normal calling mode.

A user may also have the ability to send out invites to individuals to ask them to participate in a conference call. The user may be able to select individuals from a contact list to cause invites to be sent to the selected individuals. A user may also be provided with a web interface that allows the user to send out invitations. Invitations could be delivered via voice messages, SMS or MMS messages, e-mail, by contacting an individual and performing an interactive voice response application, or by other suitable means. The user may also be able to schedule the delivery of such invitations.

In some instances, the user could set his account into conference calling mode, and also setup an identification/access code that callers must use to join into a conference call that involves the user's account. The user may have the option of specifying different identification/access codes for different individuals. Information regarding the identification/access codes could be included in invites sent to individuals. Of course, an identification/access code may not be required for any participants, or identification/access codes may be required for some participants, but not all.

A user may also be capable of setting up a list for a conference call ahead of the time that a call is to be conducted. The list could be of people who are to be granted access to the call, or people who are to be excluded from the call, or both. When the user's account is placed into the conference calling mode, people on an excluded list will be unable to join the call. The communication setup unit could exclude callers based on the caller ID information that is received during call setup, or in other ways.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of managing telephony communications for an IP telephony device, the method being performed by at least an IP telephony system, the method comprising:
   setting an account of an IP telephony device into a conference calling mode in response to a triggering event; and
   handling an incoming telephony communication setup request directed to the account by directing each telephony communication setup request as a request to join a conference call with the IP telephony device until a request to set the account into a normal calling mode is received.

2. The method of claim 1, wherein each time that a telephony communication setup request directed to the account is received, said handling comprises:
   handling the incoming telephony communication setup request as a request to join a conference call with the IP telephony device if the account is set into the conference calling mode; and
   handling the incoming telephony communication setup request as a normal telephony communication setup request if the account is set into the normal calling mode.

3. The method of claim 2, wherein handling the incoming telephony communication setup request as a request to join a conference call comprises:
   determining whether the IP telephony device is currently conducting a telephony communication;
   setting up a new telephony communication with the IP telephony device if the IP telephony device is not currently conducting a telephony communication; and
   conferencing the party that sent the setup request into a current telephony communication being conducted by the IP telephony device if the IP telephony device is already conducting a telephony communication.

4. The method of claim 1, wherein the triggering event is the receipt of a request to set the account of the IP telephony device into a conference calling mode.

5. The method of claim 4, wherein the request is caused to be sent by a user of the IP telephony device.

6. The method of claim 4, wherein the request is received from the IP telephony device itself.

7. The method of claim 4, wherein the request is received from a web interface accessed by a user of the IP telephony device.

8. The method of claim 1, wherein handling an incoming telephony communication setup request directed to the account comprises:
   determining if the IP telephony device is currently conducting a telephony communication;
   sending a query to a user of the IP telephony device if the account is set into the conference calling mode and the IP telephony device is currently conducting a telephony communication;
   receiving a response to the query from the user of the IP telephony device; and
   handling the communication setup request based on the received response to the query.

9. The method of claim 8, wherein said sending comprises sending a query to the user of the IP telephony device which includes information obtained via data in the telephony communication setup request.

10. The method of claim 1, wherein handling an incoming telephony communication setup request directed to the account comprises:
    determining if the IP telephony device is currently conducting a telephony communication;
    sending a query to the party that sent the telephony communication setup request if the account is set into the conference calling mode and the IP telephony device is currently conducting a telephony communication;
    receiving a response to the query from the party that sent the telephony communication setup request; and
    handling the communication setup request based on the received response to the query.

11. The method of claim 10, wherein said sending comprises sending a query to the party that sent the telephony communication setup request which includes information about the existing telephony communication.

12. The method of claim 11, wherein the information about the existing telephony communication comprises information about an identity of at least one party to the existing telephony communication.

13. The method of claim 1, further comprising setting the account into a normal calling mode distinct from the conference calling mode responsive to receipt of a request.

14. The method of claim 1, wherein incoming telephony communication setup requests are directed to the same origination identifier of the account regardless of whether the account is in the conference calling mode or the normal calling mode.

15. The method of claim 1, wherein handling the incoming telephony communication setup request when the account is in the conference calling mode comprises handling an incoming telephony communication setup request that is directed to the same origination identifier as would be used when the account is not in the conference calling mode.

16. The method of claim 1, wherein telephony communication setup requests that are directed to the account when the account is in the normal calling mode are directed to a telephone number associated with the account, and wherein handling the incoming telephony communications setup request while the account is in the conference calling mode comprises handling an incoming telephony communication setup request directed to the same telephone number used when the account is in the normal calling mode.

17. A system for managing telephony communications for an IP telephony device, comprising:
   means for setting an account of an IP telephony device into a conference calling mode in response to a triggering event; and
   means for handling an incoming telephony communication setup request directed to the account by directing each telephony communication setup request as a request to join a conference call with the IP telephony device until a request to set the account into a normal calling mode is received.

18. A system for managing telephony communications for an IP telephony device, comprising:
   a conference call mode setting unit that sets an account of an IP telephony device into a conference calling mode in response to a triggering event; and
   a conference call setup unit that handles incoming telephony communication setup requests directed to the account by directing each telephony communication setup request as a request to join a conference call with the IP telephony device until a request to set the account into a normal calling mode is received.

19. The system of claim 18, wherein each time that a telephony communication setup request directed to the account is received, the conference call setup unit handles the incoming telephony communication setup request as a request to join a conference call with the IP telephony device if the account is set into the conference calling mode, and handles the incoming telephony communication setup request as a normal telephony communication setup request if the account is set into the normal calling mode.

20. The system of claim 19, wherein the conference call setup unit handles an incoming telephony communication setup request as a request to join a conference call by determining whether the IP telephony device is currently conducting a telephony communication, setting up a new telephony communication with the IP telephony device if the IP telephony device is not currently conducting a telephony communication, and conferencing the party that sent the setup request into a current telephony communication being conducted by the IP telephony device if the IP telephony device is already conducting a telephony communication.

21. The system of claim 18, wherein the conference call mode setting unit that sets an account of an IP telephony device into a conference calling mode when a request to set the account of the IP telephony device into a conference calling mode is received.

22. The system of claim 21, wherein the request is one which was caused to be sent by a user of the IP telephony device.

23. The system of claim 21, wherein the request is received from the IP telephony device itself.

24. The system of claim 21, wherein the request is received from a web interface accessed by a user of the IP telephony device.

25. The system of claim 18, wherein when the account of the IP telephony device is set into the conference calling mode, the conference call setup unit handles an incoming telephony communication setup request by determining if the IP telephony device is currently conducting a telephony communication, sending a query to a user of the IP telephony device if the IP telephony device is currently conducting a telephony communication, receiving a response to the query from the user of the IP telephony device, and handling the communication setup request based on the received response to the query.

26. The system of claim 25, wherein the query sent to the user of the IP telephony device includes information obtained via data in the telephony communication setup request.

27. The system of claim 18, wherein when the account of the IP telephony device is set into the conference calling mode, the conference call setup unit handles an incoming telephony communication setup request by determining if the IP telephony device is currently conducting a telephony communication, sending a query to the party that sent the telephony communication setup request if the IP telephony device is currently conducting a telephony communication, receiving a response to the query from the party that sent the telephony communication setup request, and handling the communication setup request based on the received response to the query.

28. The system of claim 27, wherein the query sent to the party that sent the telephony communication setup request includes information about the existing telephony communication.

29. The system of claim 28, wherein the information about the existing telephony communication comprises information about an identity of at least one party to the existing telephony communication.

30. The system of claim 18, wherein the conference call mode setting unit sets the account of the IP telephony device into a normal calling mode distinct from the conference calling mode responsive to receipt of a request.

* * * * *